United States Patent
Schumann et al.

(10) Patent No.: US 12,391,257 B2
(45) Date of Patent: Aug. 19, 2025

(54) SURFACE RECOGNITION DURING DIFFERENTIAL BRAKING

(71) Applicants: Steering Solutions IP Holding Corporation, Auburn Hills, MI (US); Continental Automotive Systems, Inc., Auburn Hills, MI (US)

(72) Inventors: Clinton L. Schumann, Holly, MI (US); Karthik Rengarajan, Rochester Hills, MI (US); Michael S. Wyciechowski, Grand Blanc, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 191 days.

(21) Appl. No.: 18/139,429

(22) Filed: Apr. 26, 2023

(65) Prior Publication Data
US 2024/0359693 A1    Oct. 31, 2024

(51) Int. Cl.
| | |
|---|---|
| *B60W 40/06* | (2012.01) |
| *B60W 10/04* | (2006.01) |
| *B60W 10/18* | (2012.01) |
| *B60W 10/20* | (2006.01) |
| *B60W 40/068* | (2012.01) |

(52) U.S. Cl.
CPC .......... *B60W 40/068* (2013.01); *B60W 10/04* (2013.01); *B60W 10/18* (2013.01); *B60W 10/20* (2013.01); *B60W 2520/10* (2013.01); *B60W 2520/26* (2013.01)

(58) Field of Classification Search
CPC .... B60W 40/068; B60W 10/04; B60W 10/18; B60W 10/20; B60W 2520/10; B60W 2520/26
USPC .......................................................... 701/70
See application file for complete search history.

(56) References Cited

U.S. PATENT DOCUMENTS

| | | | |
|---|---|---|---|
| 10,046,743 B2 | 8/2018 | Jonasson et al. | |
| 10,046,749 B2 | 8/2018 | Jonasson et al. | |
| 2016/0325721 A1 | 11/2016 | Jonasson et al. | |

FOREIGN PATENT DOCUMENTS

| | | | | | |
|---|---|---|---|---|---|
| CN | 103171535 A | * | 6/2013 | ............ | B60T 8/1764 |
| DE | 102006034787 A1 | * | 2/2007 | ............ | B60T 8/1764 |
| DE | 102018114036 A1 | | 12/2018 | | |
| DE | 102019003282 A1 | * | 11/2019 | ...... | B60W 30/18172 |
| DE | 102021133463 A1 | | 1/2023 | | |
| EP | 0719685 A2 | * | 7/1996 | ............. | B60T 8/347 |
| JP | 11321617 A | * | 11/1999 | | |
| JP | 2009023464 A | * | 2/2009 | | |
| JP | 2011079465 A | * | 4/2011 | | |

OTHER PUBLICATIONS

DE-102019003282-A1 (Fladh et al.) (Nov. 28, 2019) (Year: 2019).*
(Continued)

*Primary Examiner* — Hung Q Nguyen
(74) *Attorney, Agent, or Firm* — Ingrassia Fisher & Lorenz, LLP

(57) ABSTRACT

Disclosed is a method, product, and system including the use of or using differential braking to determine a surface type or friction level under a road wheel of a vehicle and communicating the determined surface type or friction level under the road when to another system or component of the vehicle.

18 Claims, 3 Drawing Sheets

(56) References Cited

OTHER PUBLICATIONS

DE Office action dated Mar. 26, 2024 for DE application No. 10 2023 120 003.8.
Master's thesis in Automotive Engineering Brake Control for Lateral Vehicle Dynamics Anders Larsson et al.; 85 pages Department of Applied Mechanics ,Chalmers University of Technology https://odr.chalmers.se/bitstreams/1942a68e-e4a4-47e1-952f-ec6df3e92d1e/download.

* cited by examiner

SURFACE RECOGNITION DURING DIFFERENTIAL BRAKING

TECHNICAL FIELD

The field to which the disclosure generally relates to includes method, system, and products involving using braking pressure to determine surface type or surface friction under a road wheel.

BACKGROUND

Vehicle may include systems using differential braking.

SUMMARY OF ILLUSTRATIVE VARIATIONS

A method, product, or system including the use of or using differential braking to determine a surface type or friction level under a road wheel of a vehicle and communicating the determined surface type or friction level under the road wheel to another system or component of the vehicle.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
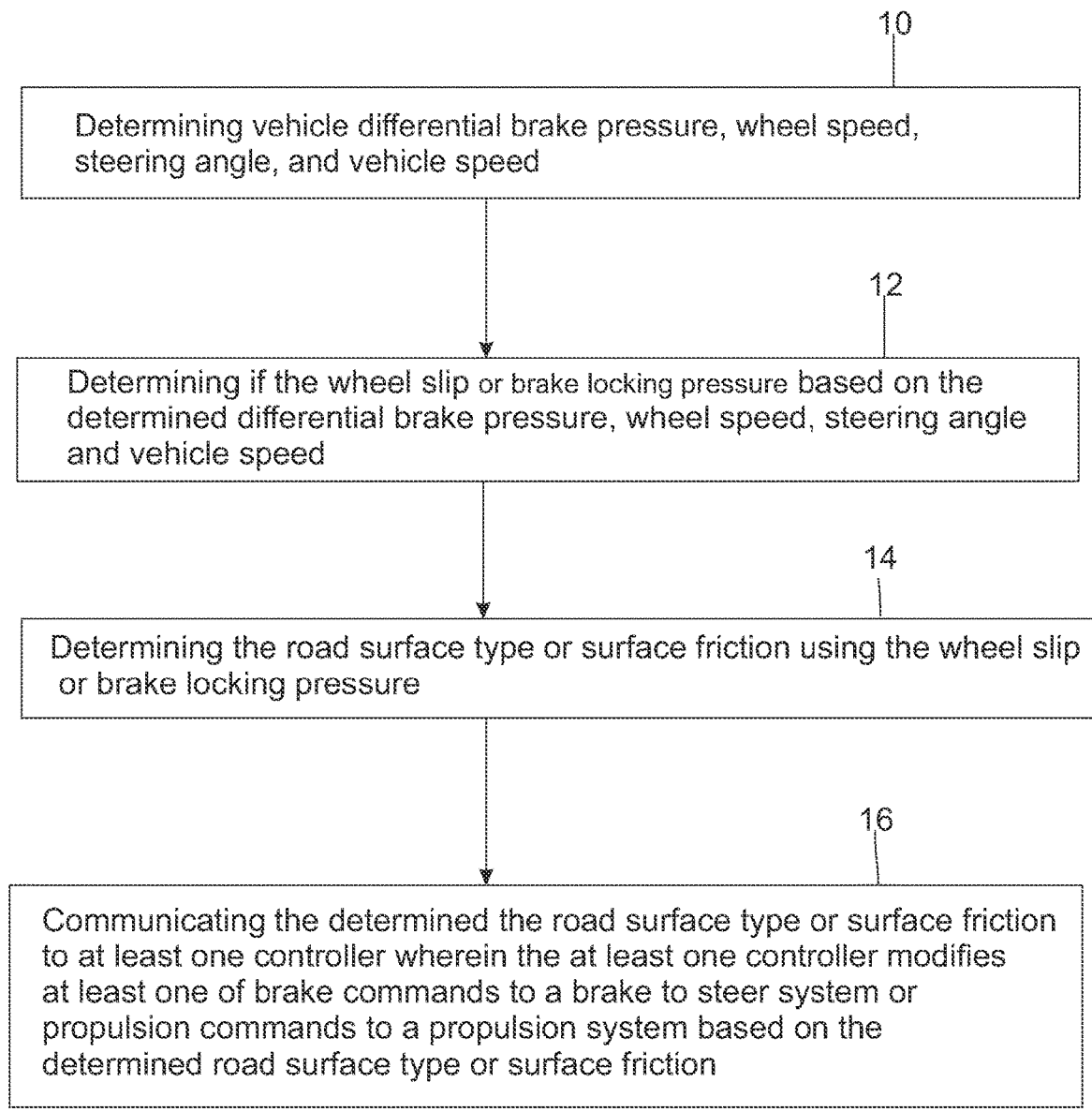
FIG. 1 illustrates a method according to a number of variations.

The following description of the variations is merely illustrative in nature and is in no way intended to limit the scope of the invention, its application, or uses.

In a number of variations differential braking may be used to steer a vehicle in the event of a failed or failing steering system, or as an assist to reduce the effort a driver must apply to a steering interface in a mechanical liked steering system. In a number of variations differential braking may be used to steer a vehicle in the event of a failed or failing steer by wire system. During a steering failure whereby by differential braking is helping steer the vehicle, the brake caliper pressures can be monitored to determine the surface friction. The surface friction information can then be used by the differential braking system, and other systems on the vehicle to improve their performance. In other words, knowing the road surface a method, component or control system can better adapt its performance to a large range of surface conditions (e.g. asphalt to ice). For example, when the differential braking feature is active, and ice is recognized, the system could change prioritize stability. The system may reduce its requested engine torque, or decrease pressure requests, etc.

A brake to steer (BtS) feature (system, method, instructions) works by braking one side of the vehicle to help steer the vehicle. The BtS feature applies the appropriate brake requests depending on the steering angle request from a human or autonomous driver. The (caliper) braking request, is a request, the actual brake pressure can be measured or closely modeled by the EBS actuator. The brake pressure and the reaction of wheel via the measured wheel speed, can be used to determine the surface friction, especially if the wheel slows down significantly relative to the vehicle speed. If a wheel slips more than an optimal or set amount, the brake pressure can be regulated. This wheel slip monitoring and pressure regulation is usually performed by the Anti-lock brake system. The amount of pressure when the wheel exceeds the slip threshold is termed the "locking pressure". Different surfaces have different locking pressures. The locking pressures on different surfaces can be evaluated and inferences can be made from the locking pressure to surface friction. During BtS the surface recognition feature may evaluate the locking pressure by using a model or lookup table, then provide a surface classification like asphalt, ice or snow. Instead of classification, a specific friction level in numerical form could also be determined. The surface information could then be broadcasted and used by the BtS feature or by external systems (like the AWD system). These systems can then tailor their performance to the specific surface instead of potentially making compromises along a range of surfaces.

Wheel rotation behavior during braking could also be influenced by the surface friction level. The wheel acceleration can also be used to help determine a surface friction level, but this is expected to be less robust than locking pressure.

If during BtS braking, the pressure level does not reach a locked level, a minimum surface determination may be still useful. In other words, if the brake pressure increases but the wheel does not lock, the friction level is at least that of current pressure level. For example, if the current caliper pressure is above the locking pressure on ice but the wheel is not in slip, the exact friction level would not be known, but the surface friction must be above that of ice.

As an indirect example—during normal vehicle operation, if a driver depresses his brake pedal, brake pressure will be delivered to all 4 calipers and the vehicle will slow. A skilled driver will sometimes depress the brake pedal, to check the surface. This is usually done to check surfaces for black ice, or other icy conditions that are hard to see. While doing this the driver will feel the deceleration of the vehicle to help determine the surface friction. The driver can also monitor the brake pedal for modulation—indicating the anti-lock brake system (ABS) became active. This indicates that at the pressure provided the wheels were at their adhesion limit (usually indicating low mu).

During normal operation, when the ABS becomes active, brake pressure is in all 4 brake calipers. An electronic stability program (ESP) and other electronic brake system) (EBS) features can brake individual wheels. These systems use vehicle signals like longitudinal deceleration, and lateral acceleration, to determine surface friction. When these systems are activated the wheels or vehicle is at the edge of their limits, therefore these holistic vehicle level signals are viable to determine surface friction. In the case of BtS activation, only one side of the vehicle is braked, so the vehicle may not be at its limit (of adhesion). So, the holistic signals are less viable to determine surface friction. When applicable, the holistic signals are generally thought to be more robust and more applicable to different vehicles with different caliper sizes, etc.

Referring to FIG. 1, a number of variations may include a method, system, or product for carrying out the acts including act 10 of determining vehicle differential brake pressure, wheel speed, steering angle, and vehicle speed. Act 12 may include determining wheel slip or brake locking pressure based upon the determined differential brake pressure, wheel speed, steering angle, and vehicle speed. Act 14 may include determining the road surface type or surface friction using the wheel slip or brake locking pressure. And act 16 may include communicating the determined the road surface type or surface friction to at least one controller wherein the least one controller modifies at least one of brake commands to a brake to steer system or propulsion commands to a propulsion system based upon the road surface type or surface friction.

Figure 2:
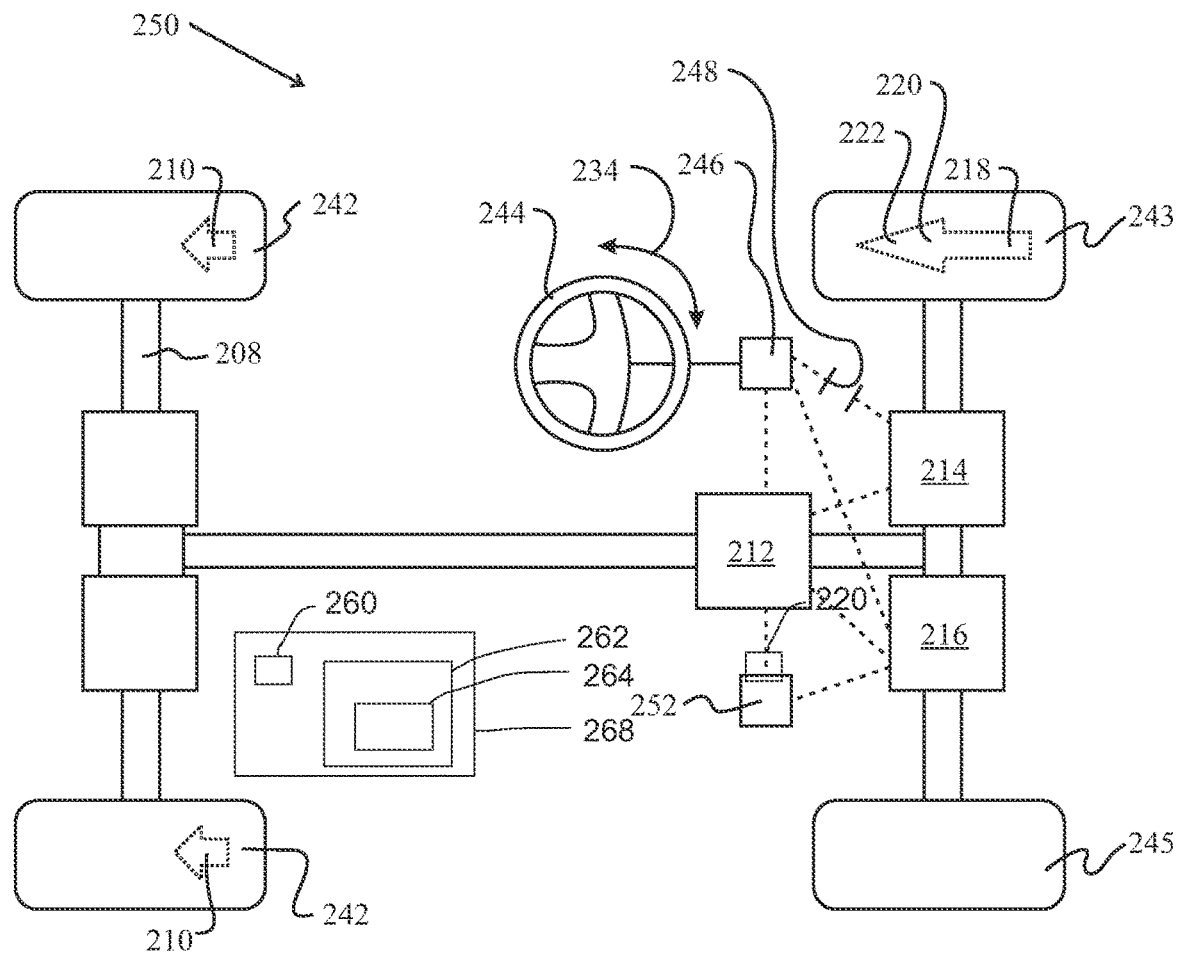
FIG. 2 illustrates a system including a steer by wire system according to a number of variations.
Figure 3:
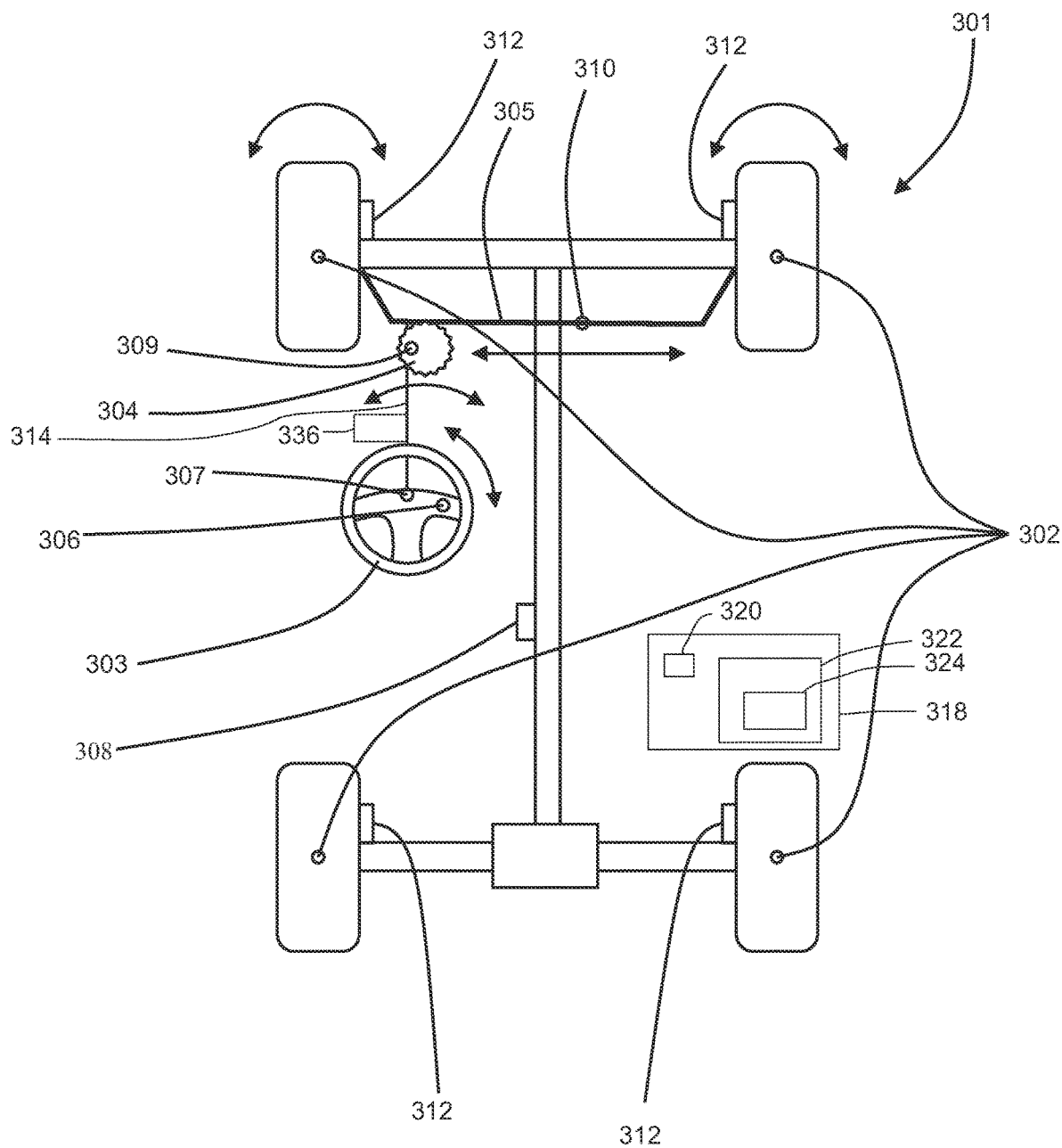
FIG. 3 illustrates a system including a steering system with a mechanical linkage according to a number of variations.

FIG. 2 illustrates a vehicle having steer by wire functionality and a system for carrying out method described herein. FIG. 3 illustrates a vehicle with a mechanical steering linkage and a system for carrying out method described herein. The components and systems of FIGS. 2 and 3 may be interchangeable provided that the vehicle in FIG. 2 retains steer by wire functionality and the vehicle in FIG. 3 retains a mechanical steering linkage.

FIG. 2 depicts an illustrative variation of various portions of a vehicle equipped with hardware sufficient for carrying out at least some of the systems and methods described herein. A vehicle 250 may include a controller 212 constructed and arranged to provide brake-to-steer functionality in a vehicle 250. The controller 212 may be in operable communication with a steer-by-wire system 214 and an electronic braking system 216. The steer-by-wire system 214 and an electronic braking system 216 may be in operable communication with at least one road wheel 242. A driver may utilize a handwheel 244 including at least one handwheel actuator 246 to provide driver input 234 for lateral movement and send steering requests to the steer-by-wire system 214. The electronic braking system 216 may be in operable communication with the controller 212 and a driver braking input system 252, such as a brake pedal system, to receive driver braking input. FIG. 2 depicts a variation in which a driver is not providing driver brake input. According to some variations, the handwheel actuator 246 may be in operable communication with the controller 212, the steer-by-wire system 214, or the electronic braking system 216. In some variations, the handwheel actuator 246 may be disconnected or in a failure state 248 from or unable to communicate with the steer-by-wire system 214 or a roadwheel actuator as part of the steer-by-wire system 214. In such a variation, the handwheel actuator 246 may communicate steering requests to the controller 212, which may receive steer-by-wire system 214 health status information. Where the controller 212 has received steer-by-wire system 214 information indicative of steer-by-wire system 214 failure 248 or roadwheel actuator failure, the controller 212 may convert steering requests from the handwheel actuator 246 to brake force or brake torque requests to be communicated to the electronic braking system 216. The electronic braking system 216 may apply brake force or brake torque 220 to determined appropriate roadwheels 242 to effectuate lateral movement of the vehicle as input 234 by the driver via the handwheel 244. As illustrated by controller or system 268 one or more of the controllers or system shown in FIG. 2 may be provided with and may include a processor 260, memory 262, wherein the instructions 264 stored in the memory 262 are executable by steering component of the vehicle has failed or in failing. Furthermore, wherein the instructions 264 stored in the memory 262 are executable by the processor 260 to carry out any of the methods or achieve any functionality described herein.

Referring now to FIG. 3, an illustrative variation of a vehicle equipped with hardware that allows it to carry out at least some of the methods disclosed herein is shown. A vehicle 301 is equipped with roadwheels 302 and a handwheel 803 for turning the roadwheels 302 via a pinion 304 that engages a rack 305 that is constructed and arranged to turn the roadwheels 302. In the illustrative variation shown, the handwheel 303 is equipped with a hand wheel torque sensor 306 and a hand wheel angle sensor 307 so that any turning of the handwheel may produce sensor data that may be communicated to or accessed by a controller 308. Although, in this illustrative variation, the controller 308 is shown onboard the vehicle, the controller may also be located somewhere apart from the vehicle and communicated with wirelessly by the sensors or the vehicle. The pinion 304 may be equipped with a pinion torque sensor 309 so that any turning of the pinion may be observed by or communicated to the controller 308 and utilized by the methods described herein. In the illustrative variation shown, the rack 305 is equipped with a rack force sensor 310 so that any rack forces detected during driving may be observed by or communicated to the controller 808 and utilized by the methods described herein. The vehicle may have a steering shaft 314 connecting the steering wheel or steering interface 803 to the pinion 304. An electric power steering assist or hydraulic power steering device 316 may be connected to the shaft 314 to assist the drive in steering the roadwheels of the vehicle by reduce the force or torque the driver would need to apply to the steering wheel or steering interface 304 if the power steering device 316 was not present. Also shown in this illustrative variation, the roadwheels 302 may be equipped with roadwheel sensors so that any roadwheel data detected during driving may be observed by or communicated to the controller 308 and utilized by the methods described herein. Additionally, in the illustrative variation shown, brakes 312 are located near the roadwheels 302. Another controller 318 may be provided and may include a processor 320, memory 322, wherein the instructions 324 stored in the memory 362 are executable by the processor 360 to determine if the hand wheel angle sensor 307 or if the pinion 304, rack 305, pinion sensor 309, or rack sensor 310 have failed. Furthermore, wherein the instructions 324 stored in the memory 362 are executable by the processor 360 to carry out any of the methods or achieve any functionality described herein. Modules, controllers described herein may include software, hardware, or a computing device including non-transitory computer readable medium, such as but not limited to memory, having instructions stored there on, and a processor for executing the instructions to perform the acts, steps, methods and functionality described herein. Multiple modules and controllers and there associated the acts, steps, methods and functionality may be contains in or achieved by one or more computing devices.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method including: determining vehicle differential brake pressure at a road wheel, wheel speed, steering angle, and vehicle speed; determining wheel slip or brake locking pressure based upon the determined differential brake pressure at a road wheel, wheel speed, steering angle, and vehicle speed; determining the road surface type or surface friction using the wheel slip or brake locking pressure; communicating the determined the road surface type or surface friction to at least one controller wherein the at least one controller modifies at least one of brake commands to a brake to steer system or propulsion commands to a propulsion system based upon the determined road surface type or surface friction.

Variation 2 may include a method as set forth in Variation 1 wherein the at least one controller modifies at least one of brake commands to a brake the steer system.

Variation 3 may include a method as set forth in Variation 1 wherein the at least one controller modifies propulsion commands to the propulsion system.

Variation 4 may include a method as set forth in Variation 2 wherein the at least one controller modifies propulsion commands to the propulsion system.

Variation 5 may include a method as set forth in Variation 1 wherein the determining the road surface type or surface friction using the wheel slip based on the wheel exceeding a slip threshold.

Variation 6 may include a method as set forth in Variation 1 wherein the determining the road surface type or surface friction is based on brake locking pressure.

Variation 7 may include a method as set forth in Variation 1 further comprising determining if a steer by wire system has failed or is failing prior to act of the at least one controller modifies at least one of brake commands to a brake to steer system or propulsion commands to a propulsion system based upon the road surface type or surface friction.

Variation 8 may include a method as set forth in Variation 1 wherein the vehicle comprises a mechanical steering linkage.

Variation 9 may include a product including non-transitory computer readable medium having instructions executable by a processor to provide the functionality comprising: determining vehicle differential brake pressure at a road wheel, wheel speed, steering angle, and vehicle speed; determining the locking brake pressure based upon the determined differential brake pressure at a road wheel, wheel speed, steering angle, and vehicle speed; determining the road surface type or surface friction using the locking brake pressure; communicating the determined the road surface type or surface friction to at least one controller wherein the at least one controller modifies at least one of brake commands to a brake to steer system or propulsion commands to a propulsion system based upon the determined road surface type or surface friction.

Variation 10 may include a product as set forth in Variation 9 wherein the at least one controller modifies at least one of brake commands to a brake the steer system.

Variation 11 may include a product as set forth in Variation 9 wherein the at least one controller modifies propulsion commands to the propulsion system.

Variation 12 may include a product as set forth in Variation 10 wherein the at least one controller modifies propulsion commands to the propulsion system.

Variation 13 may include a product as set forth in Variation 9 wherein the determining the road surface type or surface friction using the wheel slip based on the wheel exceeding a slip threshold.

Variation 14 may include a product as set forth in Variation 9 wherein the determining the road surface type or surface friction is based on brake locking pressure.

Variation 15 may include a product as set forth in Variation 9 further comprising determining if a steer by wire system has failed or is failing prior to act of the at least one controller modifies at least one of brake commands to a brake to steer system or propulsion commands to a propulsion system based upon the road surface type or surface friction.

Variation 16 may include a vehicle system including a processor, memory, instructions stored in the memory and executable by the processor to provide the functionality comprising: determining vehicle differential brake pressure at a road wheel, wheel speed, steering angle, and vehicle speed; determining the locking brake pressure based upon the determined differential brake pressure at a road wheel, wheel speed, steering angle, and vehicle speed; determining the road surface type or surface friction using the locking brake pressure; communicating the determined the road surface type or surface friction to at least one controller wherein the at least one controller modifies at least one of brake commands to a brake to steer system or propulsion commands to a propulsion system based upon the determined road surface type or surface friction.

Variation 17 may include a system as set forth in Variation 16 wherein the at least one controller modifies at least one of brake commands to a brake the steer system.

Variation 18 may include a system as set forth in Variation 16 wherein the at least one controller modifies propulsion commands to the propulsion system.

Variation 19 may include a system as set forth in Variation 17 wherein the at least one controller modifies propulsion commands to the propulsion system.

Variation 20 may include a system as set forth in Variation 16 wherein the determining the road surface type or surface friction using the wheel slip based on the wheel exceeding a slip threshold.

The above description of select examples of the invention is merely illustrative in nature and, thus, variations or variants thereof are not to be regarded as a departure from the spirit and scope of the invention.

What is claimed is:

1. A method comprising:
   determining vehicle differential brake pressure at a road wheel, wheel speed, steering angle, and vehicle speed;
   determining wheel slip or brake locking pressure based upon the determined differential brake pressure at a road wheel, wheel speed, steering angle, and vehicle speed;
   determining road surface type or surface friction using the wheel slip or brake locking pressure;
   communicating the determined road surface type or surface friction to at least one controller wherein the at least one controller modifies at least one of brake commands to a brake to steer system or propulsion commands to a propulsion system based upon the determined road surface type or surface friction;
   further comprising determining if a steer by wire system has failed or is failing prior to act of the at least one controller modifies at least one of brake commands to a brake to steer system or propulsion commands to a propulsion system based upon the road surface type or surface friction.

2. The method as set forth in claim 1 wherein the at least one controller modifies at least one of brake commands to the brake to steer system.

3. The method as set forth in claim 2 wherein the at least one controller modifies propulsion commands to the propulsion system.

4. The method as set forth in claim 1 wherein the at least one controller modifies propulsion commands to the propulsion system.

5. The method as set forth in claim 1 wherein the determining the road surface type or surface friction using the wheel slip based on the wheel exceeding a slip threshold.

6. The method as set forth in claim 1 wherein the determining the road surface type or surface friction is based on brake locking pressure.

7. The method as set forth in claim 1 wherein the vehicle comprises a mechanical steering linkage.

8. A product comprising non-transitory computer readable medium having instructions executable by a processor to provide the functionality comprising:
    determining vehicle differential brake pressure at a road wheel, wheel speed, steering angle, and vehicle speed;
    determining a locking brake pressure based upon the determined differential brake pressure at a road wheel, wheel speed, steering angle, and vehicle speed;
    determining road surface type or surface friction using the locking brake pressure;
    communicating the determined road surface type or surface friction to at least one controller wherein the at least one controller modifies at least one of brake commands to a brake to steer system or propulsion commands to a propulsion system based upon the determined road surface type or surface friction;
    further comprising determining if a steer by wire system has failed or is failing prior to act of the at least one controller modifies at least one of brake commands to a brake to steer system or propulsion commands to a propulsion system based upon the road surface type or surface friction.

9. The product as set forth in claim 8 wherein the at least one controller modifies at least one of brake commands to the brake to steer system.

10. The product as set forth in claim 9 wherein the at least one controller modifies propulsion commands to the propulsion system.

11. The product as set forth in claim 8 wherein the at least one controller modifies propulsion commands to the propulsion system.

12. The product as set forth in claim 8 wherein the determining the road surface type or surface friction using the wheel slip based on the wheel exceeding a slip threshold.

13. The product as set forth in claim 8 wherein the determining the road surface type or surface friction is based on brake locking pressure.

14. A vehicle system including a processor, memory, instructions stored in the memory and executable by the processor to provide the functionality comprising:
    determining vehicle differential brake pressure at a road wheel, wheel speed, steering angle, and vehicle speed;
    determining a locking brake pressure based upon the determined differential brake pressure at a road wheel, wheel speed, steering angle, and vehicle speed;
    determining a road surface type or surface friction using the locking brake pressure;
    communicating the determined the road surface type or surface friction to at least one controller wherein the at least one controller modifies at least one of brake commands to a brake to steer system or propulsion commands to a propulsion system based upon the determined road surface type or surface friction;
    further comprising determining if a steer by wire system has failed or is failing prior to act of the at least one controller modifies at least one of brake commands to a brake to steer system or propulsion commands to a propulsion system based upon the road surface type or surface friction.

15. The system as set forth in claim 14 wherein the at least one controller modifies at least one of brake commands to the brake to steer system.

16. The system as set forth in claim 15 wherein the at least one controller modifies propulsion commands to the propulsion system.

17. The system as set forth in claim 14 wherein the at least one controller modifies propulsion commands to the propulsion system.

18. The system as set forth in claim 14 wherein the determining the road surface type or surface friction using the wheel slip based on the wheel exceeding a slip threshold.

\* \* \* \* \*